US010747509B2

(12) United States Patent
Audant et al.

(10) Patent No.: US 10,747,509 B2
(45) Date of Patent: Aug. 18, 2020

(54) METHOD AND SYSTEM FOR CREATING A SEQUENCE USED FOR COMMUNICATING INFORMATION ASSOCIATED WITH AN APPLICATION

(71) Applicant: UNIMA LOGICIEL INC., Québec (CA)

(72) Inventors: Pascal Audant, Québec (CA); Lionel Audant, Québec (CA)

(73) Assignee: UNIMA LOGICIEL INC., Quebec (CA)

(*) Notice: Subject to any disclaimer, the term of this patent is extended or adjusted under 35 U.S.C. 154(b) by 0 days.

(21) Appl. No.: 16/091,053

(22) PCT Filed: Apr. 4, 2017

(86) PCT No.: PCT/IB2017/051924
§ 371 (c)(1),
(2) Date: Oct. 3, 2018

(87) PCT Pub. No.: WO2017/175135
PCT Pub. Date: Oct. 12, 2017

(65) Prior Publication Data
US 2019/0121622 A1    Apr. 25, 2019

Related U.S. Application Data

(60) Provisional application No. 62/317,697, filed on Apr. 4, 2016.

(51) Int. Cl.
*G06F 8/38* (2018.01)
*G06F 8/34* (2018.01)
(Continued)

(52) U.S. Cl.
CPC .................. *G06F 8/38* (2013.01); *G06F 8/34* (2013.01); *G06F 16/00* (2019.01); *G06F 16/212* (2019.01)

(58) Field of Classification Search
CPC . G06F 16/212; G06F 8/34; G06F 8/38; G06F 16/00
See application file for complete search history.

(56) References Cited

U.S. PATENT DOCUMENTS

| 4,841,291 A * | 6/1989 | Swix ................... G06F 3/04845 345/473 |
| 5,930,783 A | 7/1999 | Li et al. |

(Continued)

OTHER PUBLICATIONS

Cooper et al., "Using Animated 3D Graphics to Prepare Novices for CS1" (Year: 2003).*

(Continued)

*Primary Examiner* — Phillip H Nguyen
(74) *Attorney, Agent, or Firm* — Hauptman Ham, LLP

(57) ABSTRACT

A method and system are disclosed for creating a sequence used for communicating information associated with an application, the method comprising building a database, the building of the database comprising obtaining a plurality of graphics elements; associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances; in a user interface, creating a sequence of substances pertinent to the application using the database of graphics elements; adding to each substance of the sequence of substances data pertinent to the application and providing the created sequence.

13 Claims, 5 Drawing Sheets

(51) Int. Cl.
*G06F 16/00* (2019.01)
*G06F 16/21* (2019.01)

(56) References Cited

U.S. PATENT DOCUMENTS

| | | | | |
|---|---|---|---|---|
| 5,999,195 | A * | 12/1999 | Santangeli | G06T 13/80 |
| | | | | 345/473 |
| 10,133,734 | B2 * | 11/2018 | Rose Charvet | G06N 20/00 |
| 2004/0024822 | A1 * | 2/2004 | Werndorfer | G06F 3/0481 |
| | | | | 709/206 |
| 2007/0132779 | A1 | 6/2007 | Gilbert et al. | |
| 2007/0143802 | A1 * | 6/2007 | Hope | G11B 27/034 |
| | | | | 725/88 |
| 2009/0313084 | A1 * | 12/2009 | Chugh | G06Q 30/02 |
| | | | | 705/14.12 |
| 2010/0259545 | A1 * | 10/2010 | Elnatan | G06T 13/00 |
| | | | | 345/473 |
| 2011/0064388 | A1 * | 3/2011 | Brown | G06T 13/20 |
| | | | | 386/285 |
| 2011/0119577 | A1 * | 5/2011 | Audant | G06F 17/274 |
| | | | | 715/256 |
| 2012/0089933 | A1 | 4/2012 | Garand et al. | |
| 2012/0259895 | A1 | 10/2012 | Neely, III et al. | |
| 2013/0120401 | A1 | 5/2013 | Borysenko et al. | |
| 2014/0123021 | A1 | 5/2014 | Walkin et al. | |
| 2014/0136946 | A1 | 5/2014 | Matas | |
| 2015/0070347 | A1 | 3/2015 | Hofmann et al. | |

OTHER PUBLICATIONS

Adriana Schulz, "Character Animation from Motion Capture Data" (Year: 2010).*
International Search Report from corresponding International Application No. PCT/IB2017/051924, Jul. 2017, pp. 1-3, Canadian Intellectual Property Office, Quebec, Canada.
Canadian Office Action from corresponding Canadian Application No. 3,018,157, dated Jul. 16, 2019, pp. 1-5, Canadian Intellectual Property Office, Quebec, Canada.
Horridge, M., "A Practical Guide to Building OWL Ontologies Using Protege 4 and CO-ODE Tools," Editiion 1.3, pp. 1-108, The University of Manchester, Manchester, United Kingdom.
Kipp, M., "ANVIL 4.0, Annotation of Video and Spoken Language," User Manual, pp. 1-52, Apr. 9, 2003, Graduate College for Cognitive Science, University of the Saarland and German Research Center for Artificial Intelligence (DFKI), Germany.
European Search Report from corresponding European Patent Application No. 17778762, dated Nov. 13, 2019, pp. 1-12, European Patent Office, Munich, Germany.

* cited by examiner

US 10,747,509 B2

METHOD AND SYSTEM FOR CREATING A SEQUENCE USED FOR COMMUNICATING INFORMATION ASSOCIATED WITH AN APPLICATION

CROSS-REFERENCE TO RELATED APPLICATION

The present patent application claims priority on U.S. Provisional Patent Application No. 62/317,697, filed on Apr. 4, 2016, the subject matter of which is incorporated herein by reference.

FIELD

The invention relates to computers. More precisely, the invention pertains to a method and system for creating a sequence used for communicating information associated with an application.

BACKGROUND

Being able to share information in an application can be cumbersome for various reasons.

A first reason is that a user may have to learn a communication language.

In fact, many programming languages are available and as a consequence interoperability between programs may be an issue.

Another consequence is the fact that the learning of the programming languages can be an issue and it can also be expensive for companies.

Another issue is that a large part of mankind does not have access to specialized programming languages.

Another reason may be that the meaning of an element in a communication language may be subject to various interpretations.

This is an added difficulty associated with the nature of the programming language and the conception defaults associated with a specific application.

There is a need for a method that will overcome at least one of the above-identified drawbacks.

Features of the invention will be apparent from review of the disclosure, drawings and description of the invention below.

BRIEF SUMMARY

According to a broad aspect, there is disclosed a method for creating a sequence used for communicating information associated with an application, the method comprising use of a processing unit for building a database, the building comprising: obtaining a plurality of graphics elements; associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances; in a user interface, creating a sequence of substances pertinent to the application using the database of graphics elements; adding data pertinent to the application to each substance of the created sequence of substances and providing the created sequence.

According to an embodiment, the graphics elements are selected from a group consisting of pictures, drawings, animations and videos.

According to an embodiment, the graphics elements are obtained from the processing unit.

According to an embodiment, the graphics elements are obtained from a remote processing unit operatively connected with the processing unit.

According to an embodiment, the associating is performed by a user interacting with the processing unit.

According to an embodiment, the application comprises a communication application, further wherein the data pertinent to the application associated to a given substance comprises any of a verbal description and a textual description associated with the given substance.

According to an embodiment, the application comprises a transactional website, further wherein the data pertinent to the application associated to a given substance comprises a price associated with the given substance.

According to an embodiment, the providing of the created sequence comprises storing the created sequence in a memory.

According to an embodiment, the providing of the created sequence comprises displaying the created sequence on a display device.

According to an embodiment, the providing of the created sequence comprises transmitting the created sequence to a remote processing unit operatively connected to the processing unit.

According to a broad aspect, there is disclosed a computer comprising a central processing unit; a display device; a communication port; a memory unit comprising an application for creating a sequence used for communicating information associated with an application, the application comprising instructions for generating a database, the generating comprising: obtaining a plurality of graphics elements; associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances; instructions for creating a sequence of substances pertinent to the application using the database of graphics elements in a user interface displayed on the display device; instructions for adding data pertinent to the application to each substance of the created sequence of substances and instructions for providing the created sequence; and a data bus for interconnecting the central processing unit, the display device, the communication port, and the memory unit.

According to a broad aspect, there is disclosed a non-transitory computer-readable storage medium for storing computer-executable instructions which, when executed, cause a computer to perform a method for creating a sequence used for communicating information associated with an application, the method comprising building a database, the building comprising: obtaining a plurality of graphics elements; associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances; creating a sequence of substances pertinent to the application using the database of graphics elements in a user interface; adding data pertinent to the application to each substance of the created sequence of substances and providing the created sequence.

According to a broad aspect, there is disclosed a method for creating a sequence used for communicating information associated with an application, the method comprising use of a processing unit for: providing a database, the database comprising a plurality of graphics elements, each graphics element associated with one of a potential substance, a substance associated with an action and a substance associated with a relationship; wherein the substance associated with an action is comprised of an action and a corresponding substance associated therewith and the substance associated with a relationship is comprised with an associated link and two associated substances; in a user interface, creating a sequence of substances pertinent to the application using the database of graphics elements; adding data pertinent to the application to each substance of the created sequence of substances; and providing the created sequence.

An advantage of the method disclosed is that it enables the use of graphics elements, whether they are images objects or animation objects, for communicating information associated with an application.

Another advantage of the method disclosed herein is that it provides a framework for enabling a user to quickly and intuitively create a sequence of substance for the purpose of communicating information.

BRIEF DESCRIPTION OF THE DRAWINGS

In order that the invention may be readily understood, embodiments of the invention are illustrated by way of example in the accompanying drawings.

Figure 1:
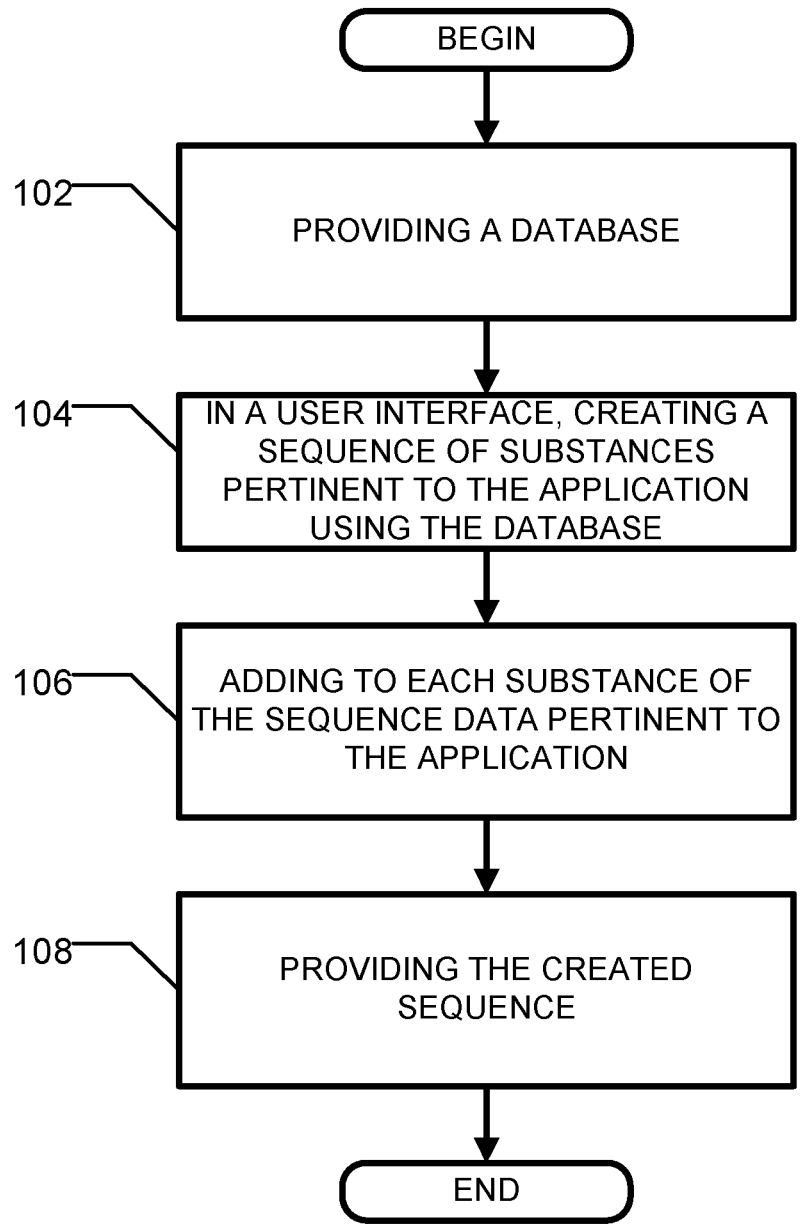
FIG. 1 is a flowchart which shows an embodiment of a method for creating a sequence used for communicating information associated with an application. The method comprises, inter alia, providing a database.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a method and system for creating a sequence used for communicating information associated with an application.

It will be appreciated that there may be various purposes for creating a sequence.

For instance, one purpose for creating the sequence may be to communicate information with users.

Figure 4:
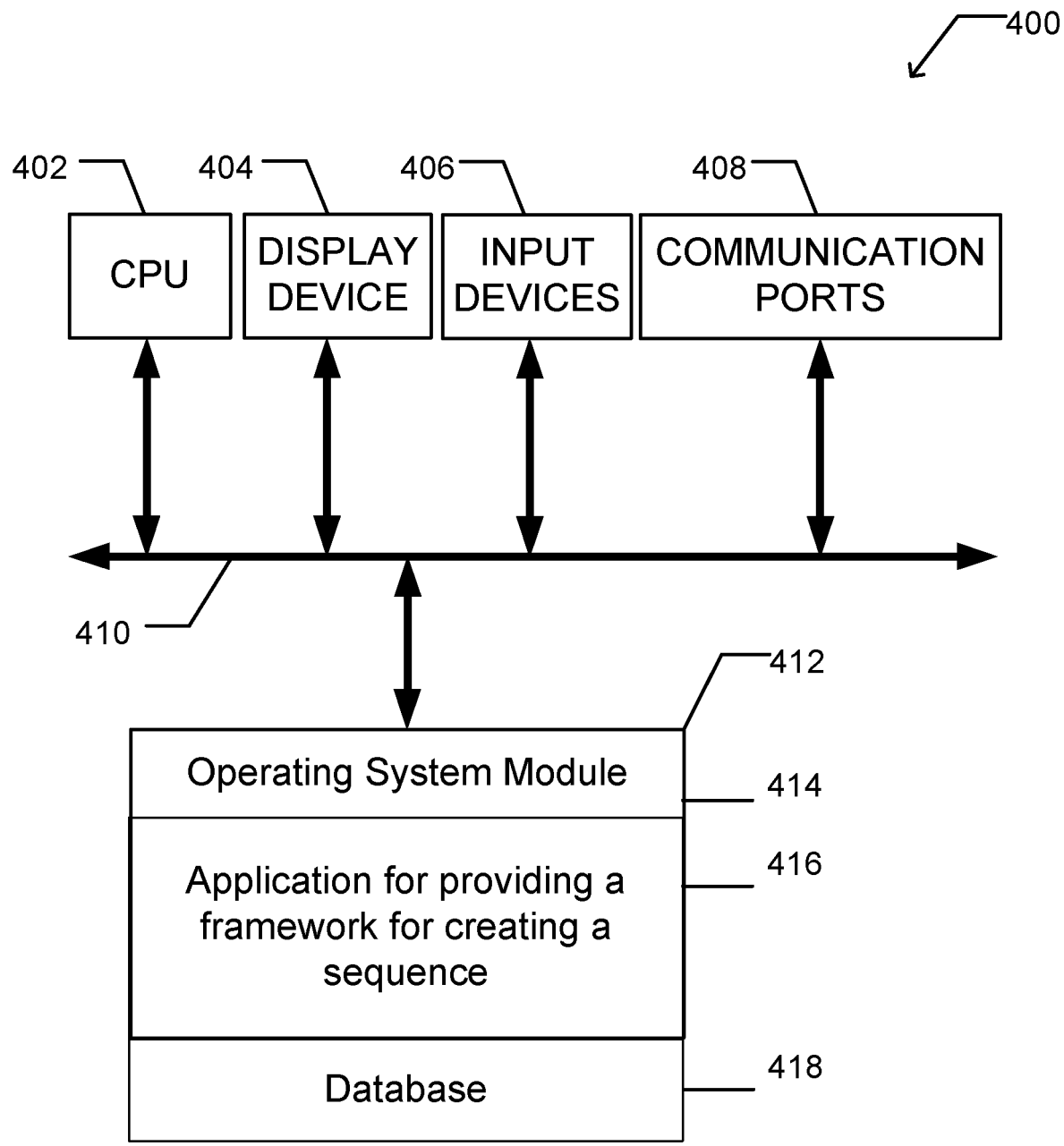
FIG. 4 is a diagram which shows an embodiment of a processing unit in which the method for creating a sequence used for communicating information associated with an application may be implemented.

It will be appreciated that the method for creating a sequence used for communicating information associated with an application may be used for instance in a processing device, also referred to as a system or a computer, such the processing device shown in FIG. 4.

Now referring to FIG. 4, it will be appreciated that the processing device 400 comprises a central processing unit (CPU) 402, also referred to as a microprocessor, a display device 404, input devices 406, communication ports 408, a data bus 410 and a memory unit 412.

The CPU 402 is used for processing computer instructions. The skilled addressee will appreciate that various embodiments of the CPU 402 may be provided.

The display device 404 is used for displaying data to a user interacting with the processing device 400. The skilled addressee will appreciate that various types of display device may be used.

In one embodiment, the display device 404 comprises a standard liquid-crystal display (LCD) monitor.

The communication ports 408 are used for sharing data with the processing device 400.

The communication ports 408 may comprise for, instance, a universal serial bus (USB) port for connecting a keyboard and a mouse to the digital computer 202.

The communication ports 408 may further comprise a data network communication port such as an IEEE 802.3 (Ethernet) port for enabling a connection of the processing device 400 with another computer via a data network.

The skilled addressee will appreciate that various alternative embodiments of the communication ports 408 may be provided.

In one embodiment, the communication ports 408 comprise an Ethernet port and a mouse port (e.g. Logitech™).

The memory unit 412 is used for storing computer executable instructions.

It will be appreciated that the memory unit 412 comprises in one embodiment an operating system module 414.

It will be appreciated by the skilled addressee that the operating system module 414 may be of various types.

In an embodiment, the operating system module 414 is Windows™ 8 manufactured by Microsoft™. The skilled addressee will appreciate that various alternative embodiments may be used for the operating system module 414.

The memory unit 412 further comprises an application for creating a sequence 416. The application for creating a sequence 416 operates as further explained below.

The memory unit 412 further comprises a database 418 for storing data.

Now referring back to FIG. 1 and according to processing step 102, a database is provided.

While in one embodiment the database may be already available, in another embodiment, the database is created.

Figure 2:
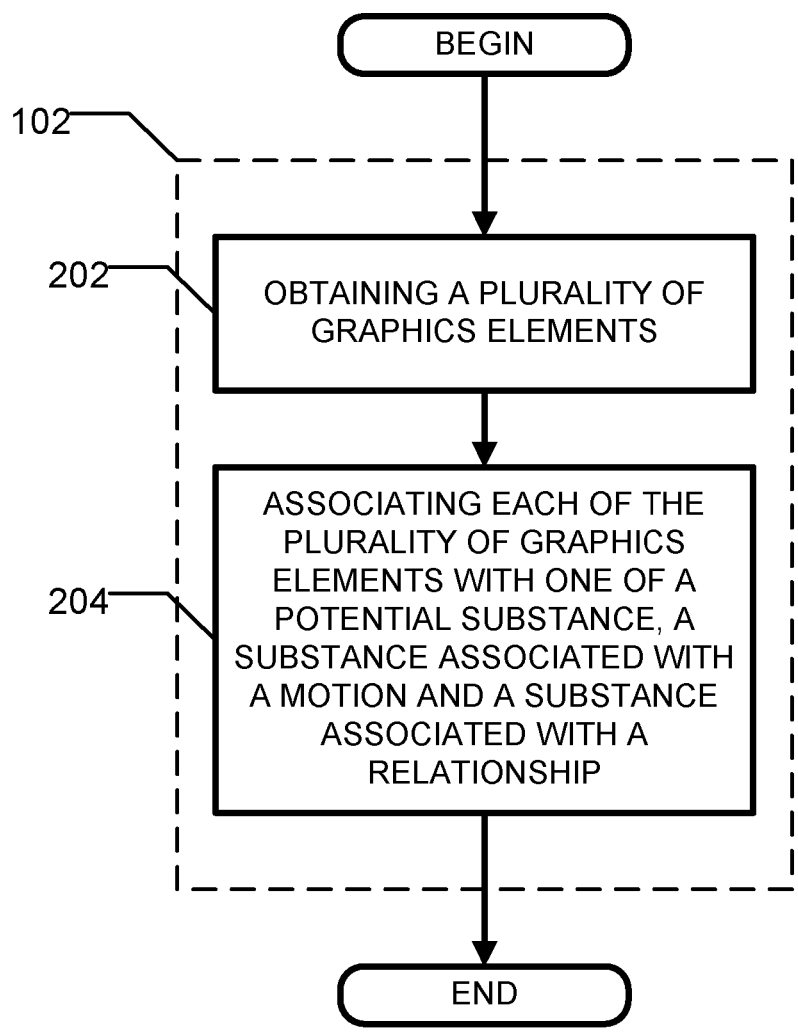
FIG. 2 is a flowchart which shows an embodiment for providing the database.

Now referring to FIG. 2, there is shown an embodiment for creating the database.

According to processing step 202, a plurality of graphics elements is obtained.

It will be appreciated that the graphics elements may be selected from a group consisting of pictures, drawings, animations, videos, etc. It will be appreciated that a graphics element comprises a portion of a visual element. For instance, the graphics element may be a subject or an object in a picture or in a drawing. In the case of a video or an animation, the graphics element may be a portion of each frame or a set of frames of respectively the video and the animation. For instance, the graphics element may be a subject in an animation.

In fact, it will be appreciated that the graphics element describes any object or element that can be used to represent or express visually an idea or concept to a user.

Moreover, it will be appreciated that the plurality of graphics elements may be obtained according to various embodiments.

In one embodiment, the plurality of graphics elements is obtained locally in the processing device with which the user is interacting.

In an alternative embodiment, the plurality of graphics elements is obtained from a remote location such as from instance from a remote processing device operatively connected with the processing device. The remote processing device may be accessed via a data network.

The data network may be at least one of a local area network (LAN), a metropolitan area network (MAN) and a wide area network (WAN). In one embodiment, the data network comprises the Internet.

It will be appreciated that the obtaining of the plurality of graphics elements may be performed according to various embodiments. For instance, the obtaining of the plurality of graphics elements may comprise firstly obtaining the visual assets, such as a plurality of pictures or a plurality of images, and then extracting the graphics elements from the visual assets, i.e., from the plurality of pictures for instance. It will be appreciated that the extracting of a given graphics element may comprise a user selecting the given graphics element to extract, such as for instance a given subject or a given object in the picture.

In a fully automated mode, the given subject or the given object is extracted automatically from the corresponding picture using common imaging processing techniques based on contour determination and known to the skilled addressee.

In a manual mode, the given subject or the given object is extracted from the picture using an interaction of the user with a user interface displaying the picture. For instance, the user could manually create a contour delimiting a zone comprising the given subject or the given object to extract. The skilled addressee will appreciate that the manual mode may be cumbersome to perform in the case where a large amount of graphics elements has to be extracted. It will be appreciated that various tools may be used for manually extracting the given subject or object from the visual asset. As a matter of fact many image editing tools known to the skilled addressee could be used for that purpose.

Still referring to FIG. 2 and according to processing step 204, each of the plurality of graphics elements is associated with one of a potential substance, a substance associated with an action and a substance associated with a relationship.

Figure 3:
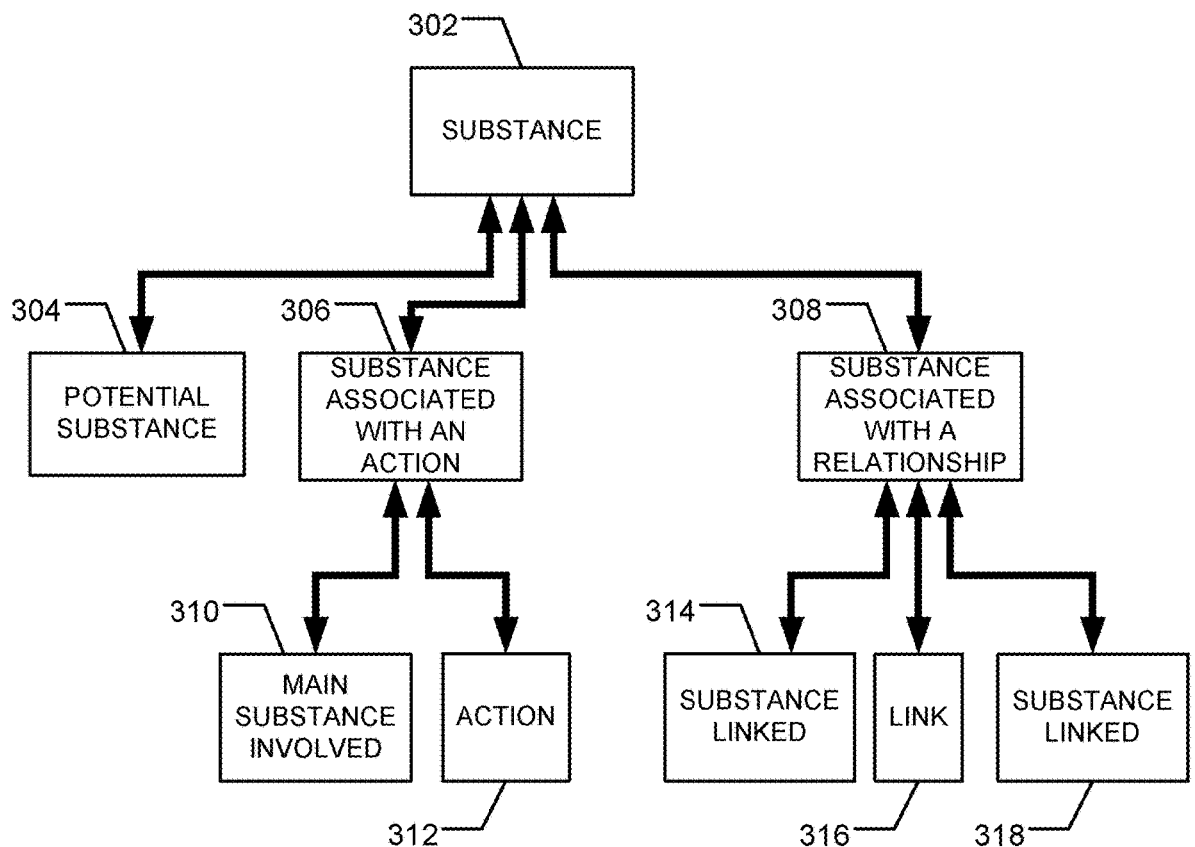
FIG. 3 is a diagram which shows the definition of the various substances involved in the method for creating a sequence used for communicating information associated with an application.

Now referring to FIG. 3, there is shown what is referred to as a potential substance 304, a substance associated with an action 306 and a substance associated with a relationship 308.

Substance Associated with an Action

A substance associated with an action 306 is a graphics element in motion in a given sequence (e.g., an animation).

It will be appreciated that the substance associated with an action 306 is comprised of two sub-elements, i.e., a main substance involved 310 and an action 312.

The main substance involved 310 can be any type of substance. It is the substance on which the action will apply.

An example of a main substance involved 310 in an animation comprising a bird singing is the bird. The bird is the main substance involved 310.

The action 312 is the action that will be applied to the main substance involved 310 to create the substance associated with an action 306.

In the example of the animation comprising a bird singing, the action 312 is the singing. It will be appreciated that the association of an action with a substance is firstly semantic and does not have to be programmed necessarily. However, a preferred execution would be indeed to represent an action as a movement function that is applied to a graphical object as is the case in graphical programming.

It will be appreciated that the substance associated with an action 306 can be recognized by a user, in one embodiment, as an object or a group of objects that are moving in a given spatial/temporal framework.

In the case of a group of objects, the common denominator is the action. If each object of the group of objects is performing the same action, the object can be associated with a substance associated with a motion 306. If this is not the case, the object is a substance associated with a relationship 308.

Substance Associated with a Relationship

Graphics elements interacting together on an animation frame can be referred to as a substance relation.

As shown in FIG. 3, a substance associated with a relationship 308 is comprised of a first substance linked 314 and a second substance linked 318.

The substance associated with a relationship 308 is also comprised of a link 316. The link 316 is a graphical link between the first substance linked 314 and the second substance linked 318. For instance, "on top of" or "below" are examples of graphical link while "son of" or "belongs to" is not. This means that graphical link cannot be directly represented, just like an action. Just like the action, in the substance associated with an action, the link is a function that position two substances in space, relative to one another, therefore creating a "graphical link."

When viewing an image or a frame of a sequence of images or frames, if more than one graphics objects are present, there is necessarily a substance associated with a relationship 308.

It will be appreciated that all combinations are possible, i.e., potential substance linked to potential substance, potential substance linked to substance associated with an action, potential substance linked to substance associated with a relationship, substance associated with an action linked to substance associated with an action, substance associated with an action linked to substance associated with a relationship and substance associated with a relationship linked to substance associated with a relationship.

For instance, in an animation showing a crowd moving next to the scene, the first substance linked 314 could be the graphical object identifying the crowd and the second substance linked 316 could be the graphical object identifying the scene.

The link 316 is a function capable of graphically linking two graphical objects.

In the embodiment of the crowd moving, "next to" would be the link since it is graphically positioned next to the crowd moving relatively to the scene in space.

The link 316 can intervene from a spatial point of view, for instance, next to, under, over, etc.

In fact, a potential substance 304 does not appear by itself in an animation for instance.

Potential Substance

A potential substance does not appear alone in an animation. A potential substance can be a graphical object in the substance associated with a motion 306. In such case, it is the main substance involved 310.

Alternatively, the potential substance can be a graphical object in the substance associated with a relationship 308. In such case, it is either the first substance linked 314 or the second substance linked 318.

In the example: the cat eats the mouse, the cat and the mouse are each a potential substance. More precisely, each of the cat and the mouse are a potential substance. The cat is also the main substance of the motion.

It will be therefore appreciated that a potential substance can be seen as an element involved in something.

It will be appreciated by the skilled addressee that the associating may be performed according to various embodiments.

In one embodiment, the associating is performed by a user interacting with the processing device displaying the plurality of graphics elements.

More precisely, the associating may be performed using a user interface.

For instance and in one embodiment, the user may select a given graphics element and associate it with one of a potential substance, a substance associated with an action and a substance associated with a relationship.

The association may be made for instance by clicking on the graphics element and making a corresponding selection on a menu displayed near the graphics element.

In another embodiment, the association is performed automatically using a processing routine. The processing routine operates as follows. According to a first step, a test is performed in order to determine a number of graphics elements identified within a frame. If the number of graphics elements identified within a frame is greater than one, this means that there is a graphics element which is a substance associated with a relationship. According to a second step, a test is performed in order to find out if the graphics element is associated with a movement function. If this is the case, the graphics element is substance associated with an action. If the graphics element is neither a relation substance nor a substance associated with a relationship, it means that the graphics element is a potential substance.

Now referring to FIG. 1 and according to processing step 104, a sequence of substances pertinent to the application is created in a user interface.

It will be appreciated that the sequence of substances pertinent to the application is created in a user interface using the database provided. It will be appreciated that the creation of the sequence of substance may be performed at any time after the creation of the providing of the database.

Figure 5:
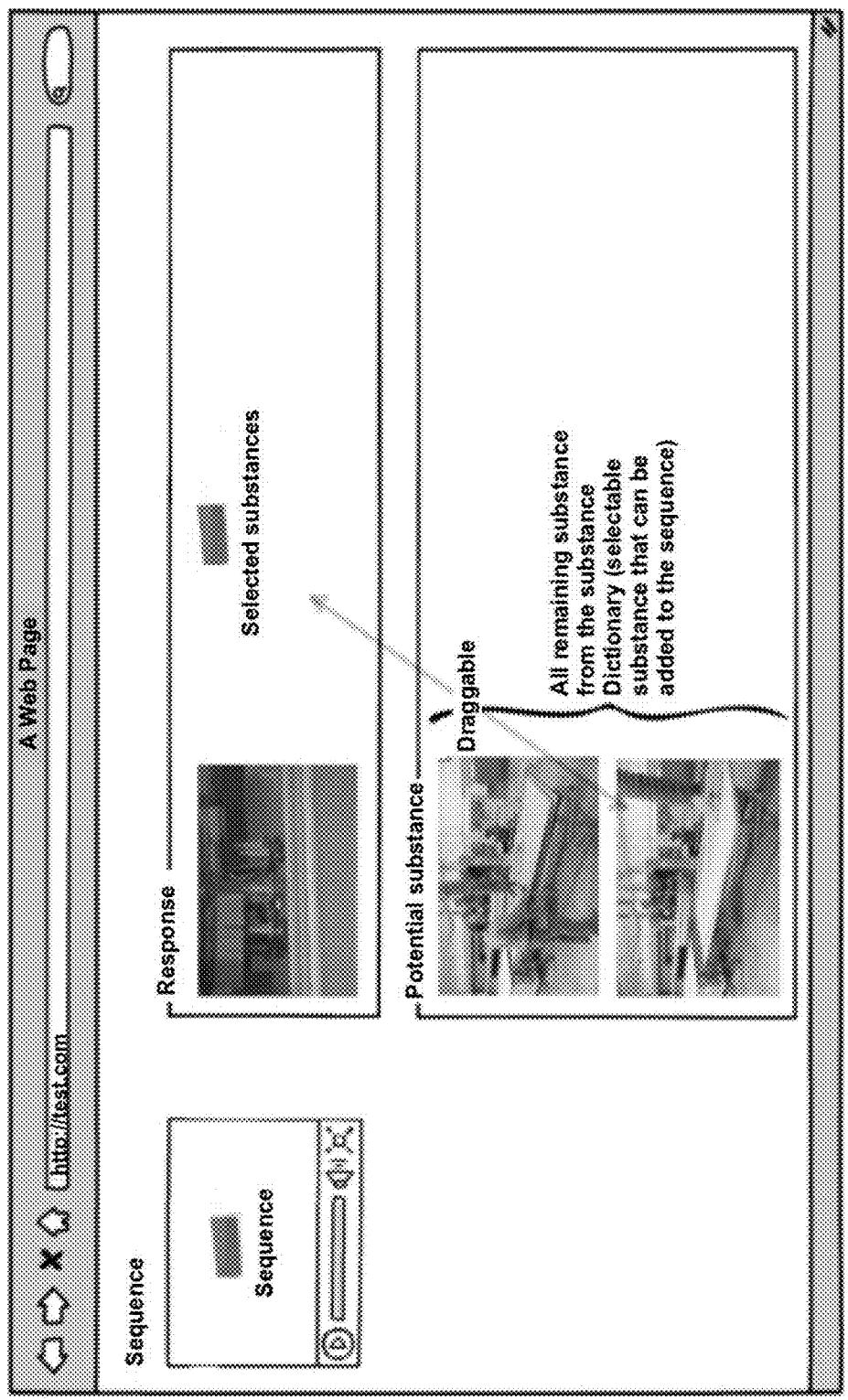
FIG. 5 is a diagram which shows an embodiment of a user interface.

Now referring to FIG. 5, there is shown an embodiment of a user interface used for creating a sequence.

In order to create the sequence, the user may first select from the database provided pertinent substances that are required for creating a sequence of substances. The skilled addressee will appreciate that pertinent substances are therefore selected depending on the application.

An example of a sequence of substances created may be for instance: "The worker places the panel on the table."

In such embodiment, the user may first select a graphics element for representing the worker.

It will be appreciated that in the framework disclosed, the substance associated with the worker will be a substance associated with an action. So the user will therefore select the graphics element for representing a worker and interact with the user interface to show the will of using it as a substance with an action. A menu of all possible actions for the worker may then be displayed on the user interface and the user may select one indicative of "placing" as an action.

The user may also select a graphics element for representing the panel and a graphics element for representing the table.

The user may select the graphics element for representing the panel and assign a substance which is a potential substance.

The user may select the graphics element for representing the worker and assign a substance which is a potential substance.

The user may select a graphic element for representing the "worker places" and assign a substance which is a substance with an action.

The user may select a graphic element for representing "the worker places the panel" and assign a substance which is a substance associated with a relationship.

The user may select a graphic element for representing "the worker places the panel on the table" and assign a substance which is a substance associated with a relationship.

It will be appreciated by the skilled addressee that the assigning may be performed according to various embodiments. Once the assigning is performed, the sequence of substances is generated. It will be appreciated that the sequence of substances may be created according to various embodiments known to the skilled addressee.

According to processing step 106, data pertinent to the application is added to each substance of the sequence of substances created.

It will be appreciated that the purpose of the adding of data pertinent to the application is to customize the sequence of substances to the application.

In fact, the data added is the additional data necessary for a smooth execution of a given application.

For instance, if the application comprises a communication application, then an example of data would be textual or verbal descriptions associated with all substances. For instance, a sound recording may be used.

In the case where the application is a transactional website, the data may comprise a value (i.e., price) of each substance.

In the case where the application is a video game, the data may comprise for instance attributes (STR Endurance, . . . ) of a character and or physical attributes necessary for the physics engine.

According to processing step 108, the created sequence of substances is provided.

It will be appreciated that the created sequence of substances may be provided according to various embodiments.

In one embodiment, the created sequence of substances is stored in a memory.

In an alternative embodiment, the created sequence of substances is displayed to a user using a display device.

In an alternative embodiment, the created sequence of substances is transmitted to a remote processing device.

It will be further appreciated that various file formats may be used for storing the sequence of substances created.

It will be appreciated that a non-transitory computer-readable storage medium is disclosed. The non-transitory computer-readable storage medium is used for storing computer-executable instructions which, when executed, cause a computer to perform a method for creating a sequence used for communicating information associated with an application, the method comprising building a database, the building comprising obtaining a plurality of graphics elements; associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances; creating a sequence of substances pertinent to the application using the database of graphics elements in a user interface; adding data pertinent to the application to each substance of the created sequence of substances; and providing the created sequence.

It will be appreciated that the application for creating a sequence 416 comprises instructions for generating a database, the generating comprising obtaining a plurality of graphics elements; associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances. The application for creating a sequence 416 further comprises instructions for creating a sequence of substances pertinent to the application using the database of graphics elements in a user interface displayed on the display device. The application for creating a sequence 416 further comprises instructions for adding data pertinent to the application to each substance of the created sequence of substances. The application for creating a sequence 416 further comprises instructions for providing the created sequence.

It will be appreciated that there is also disclosed a method for creating a sequence used for communicating information associated with an application, the method comprising use of a processing unit for providing a database, the database comprising a plurality of graphics elements, each graphics element associated with one of a potential substance, a substance associated with an action and a substance associated with a relationship; wherein the substance associated with an action is comprised of an action and a corresponding substance associated therewith and the substance associated with a relationship is comprised with an associated link and two associated substances; in a user interface, creating a sequence of substances pertinent to the application using the database of graphics elements; adding data pertinent to the application to each substance of the created sequence of substances and providing the created sequence.

It will be appreciated that an advantage of the method disclosed is that it enables the use of graphics elements, whether they are images objects or animation objects, for communicating information for a given application.

Another advantage of the method disclosed herein is that it provides a framework for enabling a user to quickly and intuitively create a sequence of substance for the purpose of communicating information.

Although the above description relates to a specific preferred embodiment as presently contemplated by the inventor, it will be understood that the invention in its broad aspect includes functional equivalents of the elements described herein.

The invention claimed is:

1. A method for creating a sequence used for communicating information associated with an application, the method comprising:

use of a processing unit for:
    building a database, the building comprising:
        obtaining a plurality of graphics elements;
        associating each of the plurality of graphics elements with one of a potential substance, a substance associated with an action and a substance associated with a relationship; wherein
            the substance associated with an action is comprised of an action and a corresponding substance associated therewith and
            the substance associated with a relationship is comprised with an associated link and two associated substances;
    in a user interface, creating a sequence of substances pertinent to the application using the database of graphics elements;
    adding data pertinent to the application to each substance of the created sequence of substances; and
    providing the created sequence.

2. The method as claimed in claim 1, wherein the graphics elements are selected from a group consisting of pictures, drawings, animations and videos.

3. The method as claimed in claim 1, wherein the graphics elements are obtained from the processing unit.

4. The method as claimed in claim 1, wherein the graphics elements are obtained from a remote processing unit operatively connected with the processing unit.

5. The method as claimed in claim 1, wherein the associating is performed by a user interacting with the processing unit.

6. The method as claimed in claim 1, wherein the application comprises a communication application, further wherein the data pertinent to the application associated to a given substance comprises any of a verbal description and a textual description associated with the given substance.

7. The method as claimed in claim 1, wherein the application comprises a transactional website, further wherein the data pertinent to the application associated to a given substance comprises a price associated with the given substance.

8. The method as claimed in claim 1, wherein the providing of the created sequence comprises storing the created sequence in a memory.

9. The method as claimed in claim 1, wherein the providing of the created sequence comprises displaying the created sequence on a display device.

10. The method as claimed in claim 1, wherein the providing of the created sequence comprises transmitting the created sequence to a remote processing unit operatively connected to the processing unit.

11. A computer comprising:
a central processing unit;
a display device;
a communication port;
a memory unit comprising an application for creating a sequence used for communicating information associated with an application, the application comprising:
    instructions for generating a database, the generating comprising:
        obtaining a plurality of graphics elements;
        associating each of the plurality of graphics elements with one of a potential substance, a substance associated with an action and a substance associated with a relationship; wherein the substance associated with an action is comprised of an action and a corresponding substance associated therewith and the substance associated with a relationship is comprised with an associated link and two associated substances;
    instructions for creating a sequence of substances pertinent to the application using the database of graphics elements in a user interface displayed on the display device;
    instructions for adding data pertinent to the application to each substance of the created sequence of substances; and
    instructions for providing the created sequence; and
a data bus for interconnecting the central processing unit, the display device, the communication port, and the memory unit.

12. A non-transitory computer-readable storage medium for storing computer-executable instructions which, when executed, cause a computer to perform a method for creating a sequence used for communicating information associated with an application, the method comprising:
    building a database, the building comprising:
        obtaining a plurality of graphics elements;
        associating each of the plurality of graphics elements with one of a potential substance, a substance associated with an action and a substance associated with a relationship; wherein
            the substance associated with an action is comprised of an action and a corresponding substance associated therewith and
            the substance associated with a relationship is comprised with an associated link and two associated substances;
    creating a sequence of substances pertinent to the application using the database of graphics elements in a user interface;
    adding data pertinent to the application to each substance of the created sequence of substances; and
    providing the created sequence.

13. A method for creating a sequence used for communicating information associated with an application, the method comprising:
use of a processing unit for:
    providing a database, the database comprising a plurality of graphics elements, each graphics element associated with one of a potential substance, a substance associated with an action and a substance associated with a relationship; wherein
        the substance associated with an action is comprised of an action and a corresponding substance associated therewith and
        the substance associated with a relationship is comprised with an associated link and two associated substances;
    in a user interface, creating a sequence of substances pertinent to the application using the database of graphics elements;
    adding data pertinent to the application to each substance of the created sequence of substances; and
    providing the created sequence.

* * * * *